(12) United States Patent
Clough

(10) Patent No.: US 6,767,460 B1
(45) Date of Patent: Jul. 27, 2004

(54) FILTER MEDIA CONTAINING ION EXCHANGE ADDITIVES

(75) Inventor: Thomas J. Clough, Grover Beach, CA (US)

(73) Assignee: Ensci Inc., Pismo Beach, CA (US)

( * ) Notice: Subject to any disclaimer, the term of this patent is extended or adjusted under 35 U.S.C. 154(b) by 17 days.

(21) Appl. No.: 10/118,831

(22) Filed: Apr. 8, 2002

(51) Int. Cl.[7] .......................... B01D 24/00; B01D 39/00
(52) U.S. Cl. ..................... 210/502.1; 210/503; 210/505
(58) Field of Search ................................ 210/483, 488, 210/496, 502.1, 503, 504, 505, 506, 508, 500.27

(56) References Cited

U.S. PATENT DOCUMENTS

| | | | |
|---|---|---|---|
| 4,216,281 A | | 8/1980 | O'Reil et al. |
| 4,361,486 A | * | 11/1982 | Hou et al. .................. 210/722 |
| 4,383,011 A | | 5/1983 | McClelland et al. |
| 4,529,677 A | | 7/1985 | Bodendorf |
| 4,594,158 A | | 6/1986 | Chong et al. |
| 4,830,837 A | * | 5/1989 | Justice et al. ................ 423/181 |
| 5,085,780 A | * | 2/1992 | Ostreicher ................... 210/683 |
| 5,221,587 A | | 6/1993 | Bohnstedt et al. |
| 5,929,204 A | | 7/1999 | Noguchi et al. |
| 5,989,750 A | | 11/1999 | Ohba et al. |
| 6,103,092 A | * | 8/2000 | Silva .......................... 205/536 |
| 6,103,122 A | | 8/2000 | Hou et al. |
| 6,150,426 A | * | 11/2000 | Curtin et al. .................. 521/28 |
| 6,165,367 A | * | 12/2000 | Partridge .................... 210/670 |

FOREIGN PATENT DOCUMENTS

| | | | |
|---|---|---|---|
| FR | 2440085 | | 5/1980 |
| JP | 56-44040 | * | 4/1981 |

OTHER PUBLICATIONS

Derwent abstract of Japanese Patent No. 56–44040 (1981).*

* cited by examiner

Primary Examiner—John Kim
(74) Attorney, Agent, or Firm—Frank J. Uxa

(57) ABSTRACT

A filter media having a micronized ion exchange additive associated with the filter media. Further, the filter media can have the micronized additive associated with the filter media through a charged linking polymer.

20 Claims, No Drawings

FILTER MEDIA CONTAINING ION EXCHANGE ADDITIVES

BACKGROUND OF THE INVENTION

The present invention relates to an improved filter media containing an ion exchange micronized porous powder polymeric additive, which is associated with the filter media through a water soluble charged liking polymer to improve the efficiency of the filter media.

Further the present invention relates to a filter media having a micronized porous powder polymeric additive having at least 50% of the total number of particles in the additive less than 4 microns. In brief the filter media includes the addition of the micronized ion exchange additive to the filter media to improve the efficiency of the filter media. There are many gases and liquids that contain charged ions such as anions and/or cations. These include liquids such as aqueous and organic based and mixtures, derived from processes and waste streams. Many of these streams contain cations and/or anions which need to be reduced to a certain level and/or removed in order to minimize the concentration of such ions prior to discharge as a waste and/or reuse as a process liquid. In certain instances the ions such as heavy metal ions provide a major environmental concern at both industrial and governmental sites. In addition certain ions have value and can be recovered. For example certain ions such as antimony, iron, nickel, copper, silver, and other metal cations including alkaline earth metal ions need to be removed from the process water for process water recycle and/or water discharge. Further there are anions in liquids which need to be reduced and/or minimized such as borate anions. As is well known the reuse of process liquids, discharge of liquids, and water runoff can present significant environmental concern and contamination of both water sources and soil.

SUMMARY OF THE INVENTION

A new filter media which improves the efficiency for binding certain charged ions to the filter media has been discovered. In brief, the filter media includes the addition of a micronized porous organic polymer powder ion exchange additive having functional groups with a preferential affinity for certain charged ions in streams processed by the filter media.

A new filter media, which improves the efficiency of filter media for ion binding has been discovered. In brief the filter media includes the association of a micronized porous organic polymer ion exchange additive having at least 50% of the total number of particles in the additive less than 4 microns with the filter media to bind certain charged ions in the processed medium. In brief the efficiency of the filter media is improved by providing a significant increase in both the surface area and the number of ion exchange additive particles per unit volume in the filter media. The increase in surface area and number of particles per unit volume provides for improvement in binding efficiency between the additive and the charged ion particularly an improvement in both the capacity and the rate at which the ion is removed from the processed stream.

DETAILED DESCRIPTION OF THE INVENTION

In one broad aspect, the present filter media comprise the addition of a micronized porous organic polymer ion exchange powder additive containing functional groups with a preferential affinity for certain charged ions to the filter media. In a preferred embodiment, the porous organic polymers have a plurality of micro and macropores, i.e. the porosity of the polymer allows the charged ion in the medium to contact both the outer surface of the polymer and the internal surface area created by the porosity of the organic polymer. The functional groups having a preferential affinity for a charged ion including both functional groups on the outer surface and internal surfaces in contact with ions such as in a liquid. The ion exchange additives are typically incorporated into the filter media in an amount sufficient to improve the efficiency of the filter media.

In another broad aspect, the filter media comprise the addition of both the micronized ion exchange additive and a macroporous additive to the filter media.

In another broad aspect, the present filter media comprise the addition of macroporous additive particles to filter media to improve the overall ion distribution to the ion exchange additive. In brief the filter media include the addition of macroporous containing particles having an average particle size distribution greater than that of the ion exchange additive and having a pore size distribution which will allow a plurality of ion exchange additive particles to be associated with at least a part of the internal pore structure of the macroporous additive.

In another broad aspect the porous ion exchange additive can be associated with one or more of the fibers and/or particulate and/or the macroporous particle additive in the filter media through a polymeric charged water soluble linking agent to improve the overall enhanced association and distribution of the ion exchange additive during filter media manufacture and/or use.

A particularly preferred embodiment of the present invention is the use of a charged water soluble linking agent to improve the overall enhanced association of the ion exchange additive with one or more of the components of the filter media. Thus the water soluble charged linking agent can form a bridge and/or link between the micronized ion exchange additive and one or more of the components of the filter media. It has been found that the charged linking agent allows for a more uniform dispersion or distribution of the micronized ion exchange additive throughout the filter media which allows for a more effective use of the micronized particle additive in the filter media particularly from the standpoint of capacity and capture efficiencies for ions to be bound by the ion exchange additive.

The water soluble linking agent typically has a charge opposite that of the charge on one or more of the components of the filter media and the micronized ion exchange additive. For example when the ion exchange additive is a cation exchange additive, i.e. the additive binds cations in for example a liquid such as water, i.e. surface anion charges, it is preferred that a cationic water soluble linking agent, i.e. a positive charge be used to provide for the uniform distribution of the additive in the filter media. Further components of the filter media such as cellulose, glass, and other type fibers can have a negative charge which improves overall distribution and uniformity of the ion exchange additive. Further particulate type material used in filter media such as expanded perlite, diatomaceous earth can also have negative or anion charges which also provide for improved uniformity of the ion exchange additive in the filter media.

In addition to cationic water soluble linking agents, anionic water soluble linking agents can also be used. These agents typically carry a negative charge and will associate with components of the filter media which have a positive charge. As is known by those of skill in the art charges on various fibers and/or particulate components of filter media can be modified to provide a positive charge. Thus the use of an anionic water soluble linking agent which has a negative charge can provide for a uniform distribution of an anionic ion exchange additive, i.e. it binds soluble anions in aqueous liquids and such anionic linking agents can provide for uniform distribution of the ion exchange additive on one or more of the components of a filter media.

As is set forth below, the water soluble charged linking agents preferentially bind with the outer surface functional groups of the micronized ion exchange additive while being of a molecular weight, geometric size which limits and/or minimizes the contact of the linking agent with the internal functionality of the micronized additive. It has been found that the water soluble charged linking polymers provide for an improved uniform distribution of the micronized additive and in addition provides for ease of manufacture of the filter media.

The organic polymers having functional groups with a preferential affinity for an ion in the cation or anion state bind that ion under the process conditions of liquid contact with the filter media. While the exact mechanism of inhibition is not known, it is believed that the ion is bound by the functional group such as by a cation replacing the cation when the organic porous polymer contains cation functional groups and the anion replacing the anion when the porous organic polymer contains anionic functional groups. Although ion replacement is believed to be one mechanism for binding ions, ions can also form complexes and/or be solvated to bind to the additive and such mechanisms are included in the term binding.

As set forth above, the organic polymers contain functional groups which can bind cations or anions in the filter media, which cations or anions can be displaced by the anion and/or cation to be bound by the functional groups. Further, the affinity of the organic polymer having such ion binding functional groups can have a stronger binding and/or complex formation with selected ions particularly where such ions are impurity ions or contaminant ions in various process and/or waste waters. Thus the ion can be bound to the functionality including irreversibly bound to the functionality under the process conditions of the filter media. The micronized additives in the filter media with the exceptional uniform distribution and high particle count per unit volume, provides for enhanced rate of binding as well as overall effective additive utilizations. For example a cationic ion exchange resin, i.e. it binds cations, can be very effective for the removal of iron, antimony, nickel, copper, magnesium, silver, and calcium particularly for meeting process specifications for various process applications. Further a micronized anion exchange additive can be effective for binding various anions such as borate.

It is contemplated within the scope of this invention that processes can be used to recover the bound metals from the filter media such methods including state of the art regeneration and thermal processes.

As set forth above, the organic polymers can have functionality which have affinity for the cation form. The metal impurity cation can displace the cation associated with the functional group. Typically, the cation displaced can be hydrogen ion or, for example, sodium ion. The organic polymers having such cation functionality can be further classified as strong acidic cation polymers such as sulfonic or moderate to weak acidic cation polymers. Particularly preferred acidic cation polymers are those containing phosphonic groups. Typical examples of polymers containing such functional groups, for example the sulfonic acid and/or sulfonate functionality, are those derived from polystyrene crosslinked divinylbenzene, phenol-formaldehyde polymers and other like aromatic containing polymers. As set forth above the organic polymer can have different functional groups such as functional groups containing acidic functionality such as sulphonic and phosphonic functionality on the same organic polymer.

As set forth above, acidic cation polymers are preferred for binding certain metal ions. A particularly preferred functionality on the polymer is phosphonic acid and/or phosphonate here in after referred to as phosphonic functionality. Typical examples of such functionality are:

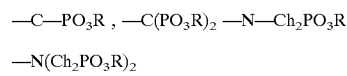

—N(Ch$_2$PO$_3$R)$_2$ where R is typically hydrogen or sodium ion, preferably hydrogen.

In general the phosphonic functionality can be incorporated into the polymer matrix by chemical reaction including grafting of such functionality, on for example the aromatic portion of polystyrene and/or phenol-formaldehyde polymers. In addition, the functionality can be incorporated by the copolymerization of unsaturated vinyl mono or gem phosphonic acid or ester monomers with other monomers patricularly styrene, with still other monomers such as acrylate or acrylonitrile together with a crosslinking agent such as divinylbenzene. A typical monomer used for such copolymerization is vinylidene diphosphonic acid or the ester thereof to produce gem phosphonic functionality. Further examples of such polymers are polymers having a plurality of amino alkylene, phosphonic acid or phosphonate associated with the organic polymer.

As set forth above bis-derivatives are also useful including imino-bis(methylenephosphonic acid). The particularly preferred functionality is amino methylenephosphonic acid groups on polystyrene cross-linked with divinylbenzene.

As set forth above, phosphonic functionality can be incorporated into the polymer by reaction with an existing polymer matrix or by copolymerization of for example a vinyl phosphonic monomer. A preferred polymer is one containing polymerized styrene monomer either as a homopolymer or an interpolymer with other polymerized monomeric units. Such polymers containing polymerized styrene are generally referred to as polystyrene polymers.

As set forth above the organic polymer can have different functional groups such as functional groups containing acidic functionality such as sulphonic and phosphonic functionality on the same organic polymer.

The weakly acidic cation polymers in general have carboxylic functionality and/or the sodium salt associated with the organic polymer. Typical examples of such polymers are those derived from unsaturated carboxylic acids such as acrylic, methacrylic or maleic crosslinked with another monomer such as divinylbenzene or ethylene dimethacrylate.

As set forth above, the organic polymer can have functionality having a preferential affinity for soluble anions, i.e. the anion associated with the functionality is displaced by the soluble anion in the electrolyte. The organic polymers having anion functionality can have both strongly basic and weakly basic anion functionality. Typical examples of strongly basic anion containing functionality are those having an ammonium functionality associated with the organic polymer. As set forth above, the anion associated with the functionality, typically sulfate or chloride, is displaced by the anion within the electrolyte. Typical ammonium groups associated with the polymer include trimethyl ammonium ion and dimethylethanol ammonium ion. Other groups include isothiouronium and derivatives thereof. Typical examples of organic polymers are polystyrene cross-linked with divinylbenzene. The ammonium ion with an appropriate anion can be attached directly to, for example, the aromatic ring of the polystyrene or through, for example, a methylene bridge. Typical examples of weakly basic polymers having anion functionality are polymers, which contain tertiary aliphatic or aromatic aliphatic amine functionalities on the polymer such as polystyrene or a polyunsaturated carboxylic acids. Such polymers are typically cross-linked with a cross-linking agent such as the cross-linking agents referred to above. Further, the polymer basic anion functionality can be obtained through aliphatic polyamine condensation reactions to produce the organic polymer. Typically, the weak base anion resins contain primary, secondary and/or tertiary amine groups generally as a mixture. Typical examples of such amine groups are trimethyl amine and dimethylethanolamine. The preferred organic polymers having anion type functionality are the strongly basic anion containing functionality particularly for their strong binding and low release or desorption of ion preferably having ammonium functionality.

A particularly preferred resin for binding of soluble boron anions such as borate are those having pending N-alkylglucamine or a derivatives thereof or trihydroxyalkylamines. A preferred amine is N-methylglucamine attached to a polystyrene polymer using a hydroxypropyl linkage. A further example of anion exchange resins are those containing the trialkylbenzyl ammonium functionality. A number of useful commercial borate specific ion exchange resins are Rohm and Haas—IRA-743 and Wofatit NK51. The latter resin has vicinal aliphatic hydroxyl groups as the active functionality.

As set forth above the organic polymers can contain primary secondary or tertiary amine groups including aliphtaic polyamine functionality. Further as set forth above, such organic polymers can contain aliphatic amine functionality. Further, such polymers can contain amine functionality with acid functionality. Particularly preferred functionalities associated with the organic polymer which contain both amine and acidic functionality are those containing secondary and tertiary amine functionality and acid functionality, such as for example, the examples set forth above.

A particularly preferred class of aliphatic aromatic amine functionality are those having amino pyridine groups associated with the organic polymer. Examples of such groups can be represented by the formula.

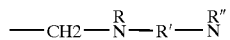

where in R is preferably an aliphatic substituent, an aliphatic polyamino substituent or a 2-picolene containing substituent R' is preferably alkylene, preferably methyleneand R" is a non-substantially interfering substituent, preferably hydrogen. Particularly preferred additives are organic polymers having functionality from 2-picolylamine, N-methly-2-picolylamine, N-2hydroxyethyl)-2-picolylamine, N-(2-methylaminoethyl)-2-picolylamine and bis-(2-picolyl) amine.

The aromatic aliphatic amine functionalities particularly the 2-picolylamine, such as bis-(2-picoly)amine, are particularly useful in binding copper and nickel.

The micronized organic polymer ion exchange additive having functional groups with affinity for anion or cation have an average particle size distribution of less than 10 microns preferably less than about 3 micron and still more preferably less than about 1 micron and still more preferable less than 0.5 microns. It has been found that the rate of ion binding can be improved by providing for an increase in both surface area in $m^2$/gram as well as particle count per unit volume of the filter media. The porosity of the preferred micronized organic polymer additive is that which allows the ion to permeate the organic polymer particle thereby affording good contact with the functional groups attached to the external and internal surfaces of the particles. Typically the average pore size distribution is from about 100 angstroms to about 1,000 angstroms typically in the range of from about 250 angstroms to about 750 angstroms. The total displacement capacity of the organic polymer having such functional groups is typically greater than one milliequivalent of displaceable ion per gram of polymer (on a dry basis), preferably greater than three and still more preferably greater than five.

In addition to the above average particle size distribution definition, the additive can be defined by the number of particles having a particle size less than a given micron size. For purposes of this definition, it is preferred that at least 50% of the total number of particles in a given weight of additive have a particle size less than about 4 microns, more preferably less than about 2 micron and still more preferable less than about 1 microns and still more preferably less than 0.5 microns. Further it is preferred that at least 90% of the total number of particles have a particle size less than about 4 microns, preferably less than about 1 micron.

As set forth above, the micronized additives can be associated with a macroporous additive to enhance the diffusion of the ion containing liquid to the micronized ion exchange additives. It is preferred that the pore size distribution in the macroporous additive is of a size that allows for a plurality of the micronized ion exchange additive particles to be associated with the internal or interior part of the macroporous additive. It has been found that the combination of the micronized and macroporous additive provide for enhanced distribution of liquid to the ion exchange additive. Typical pore size distribution and particle size distributions for the macroporous additive are set forth below.

A particularly preferred embodiment of this invention is the enhanced association of the micronized ion exchange additive particularly at average particle sizes less than 3 micron with one or more of the macroporous additives, fibers and/or particulate associated with the filter media. Thus as the average particle size of the micronized additive is decreased the effective association of the micronized additive can be improved particularly from a filter media manufacturing and use standpoint, through the use of a water soluble ionic charged polymeric linking agent.

The charged polymeric linking agent can carry a positive or negative charge. It is preferred to utilize a positive charge (cationic) water soluble linking agent with those micronized ion exchange resin and filter media components which have a negative charge. Further it is preferred that anionic linking agents be used with those micronized ion exchange resins having a positive charge and other components which have a positive charge or are modified to have a positive charge. The preference for having opposite charges between the linking agent and the micronized ion exchange resin and other components in the filter media has been found to provide for improved distribution of the micronized additive in the filter media. Further it has been found that the filter media can be manufactured with high yield of the micronized ion exchange resin being associated with the filter media. In addition the micronized ion exchange additive is more efficiently retained in the filter media during use. Thus, improvement in rate of binding of selected ions, the capacity and the retention of the micronized additive are all positive improvements in the overall efficiency of the filter media.

The particular preferred embodiments of the water soluble charged linking agent are set forth below. The various preferred embodiments particularly as to molecular weight, geometric size, concentrations for use, and process for utilization of the water soluble polymers are applicable to both cationic and anionic water soluble linking agents. The discussion below with particular reference to a cationic water soluble linking agent is in addition applicable to the anionic water soluble linking agent particularly in light of the discussion of as to the association of the anionic water soluble linking agent to anionic exchange micronized additives and filter media components which carry a positive charge.

In a preferred embodiment the charge on the macroporous additive, fiber and/or particulate in the filter media is negative and/or anionic in character. In addition the micronized ion exchange additive is selected also to have negative and/or anionic character. The cationic nature of the water soluble polymer together with a plurality of cationic charges on the polymer allow for the interaction between the cationic polymer and the other anionic components as set forth above. The use of the cationic polymer allows for a strong association of the various components set forth above with each other through the linking cationic polymer. As the particle size of the micronized metal inhibiting additive is decreased the bonding between the negative or anionic charge on the additive and the cationic polymer becomes stronger. Further the fiber and/or the particulate used in the filter media can have a negative charge on the surface, which charge can be enhanced through aqueous acidic processing. Further a water soluble anionic polymer such as a carboxylated polyacrylamide can be used to surface treat the macroporous additive, inorganic fiber and/or silica to enhance the negative or anionic charge on the surface prior to contacting with the cationic water soluble polymer linking aid. In a preferred embodiment the macroporous additive and/or fiber and/or particulate is contacted first with an aqueous solution of the cationic polymer typically at concentrations less than 2-wt % basis dry component, for a period of time for the polymer to be associated with the above components. Typical processing and contact times are less than 30 minutes, more typically less than five minutes. The ion exchange additive is preferably then introduced after such initial contacting which allows a uniform distribution of the micronized ion exchange additive on the cationic polymer treated surfaces.

Typical examples of cationic water-soluble polymers are cationic polyacrylamides and polyethlylenimine and their modifications, polyamine, polydiallyldimethylammonium chloride, cationic starch, polyamides-epichlorohydran crosslinking polymers and mixtures thereof. Examples of modified polyethylenimine are polyethylenimines or ethylenimine modified polyamidoamines whose molecular weights have been increased by cross-linking. These cross-linking reactions are not allowed to proceed to gelation. Applicable cross linkers are epichlorohydrin, polyvinyl alcohol and epichlorohydradrin and polyalkylene oxide epichlorohydrin reaction products. Further examples of cationic polymers are polydicyandiamide formaldehyde polymers and polymers of acrylic monomers comprising a cationic acrylic monomer. Particularly preferred cationic polymers are polyacrylamide and polyethlylenimine cation polymers sold under the trade name Polymin by BASF and the polyamides-epichlorohydran crosslinking polymers sold by Hercules under the trade name Polycup and Kymene.

As set forth above the cationic polymer is generally added to a slurry of the macroporous additive, fiber and/or particulate in a concentration typically less than 2 wt % preferably in the range of from 0.01 to 1% based on the dry weight of the component in the slurry. Further it is preferred that the micronized ion exchange additive be added subsequent to the slurry after initial association of the above component. Typically the molecular weights of the cationic polymers are greater than 1000, more preferably greater than 100,000. It is preferred that the cationic polymer have a moderate to high charge density and allow for uniform association of the micronized ion exchange additive on other negative charged surfaces, such as fiber, particulate or macroporous additive. Typical charge densities range from about 5 meq/gram up to about 25 or even higher. Typical molecular weights range from about 100,000 to about 10,000,000, more preferably from about 500,000 to about 5,000,000.

The cationic polymer preferably associates with the anionic surface functional groups of the micronized ion exchange additive while reducing and/or minimizing the association of the cationic polymer functional groups with the functional groups on the internal surfaces of the metal inhibiting additive. In a preferred embodiment the molecular weight and the geometric structure of the cationic polymer linking aid is of a size that reduces or minimizes the transport of the water soluble cationic polymer into the internal pores of the micronized metal inhibiting additive. As set forth above preferred molecular weights of from about 500,000 to about 5,000,000 reduce or minimize the diffusion of the polymer into the internal pores of the additive. Further the concentration of the cationic polymer linking agent is adjusted to provide for linking of the various anionic surfaces. In addition the concentration is adjusted to link external surfaces which provides for the formation of a uniform coating of the micronized ion exchange additive on one or more of the surfaces of macroporous additive, fiber and/or particulate. The concentration is adjusted for external surface linkages and in general provides for both a uniform dispersion and a very soft uniform flock if any of micronized ion exchange additive readily dispersed and associated with the other anionic surfaces as set forth above.

The concentration of the micronized additive used in the filter media of this invention is typically defined by the amount of ion introduced initially into the liquid system to be treated and that which can be generated through mechanisms for liberation of ions into the liquid. In order to control the amount of ion present in the liquid, additive concentrations in the filter media are typically in the range of from about 1.5 to about 7.5 wt % basis the total weight of the filter media. Depending on the mechanism for introducing ions to be bound such as low concentrations, then the amount of additive can be less typically in the range of from about 0.25 to 1.25 wt % basis the weight of the filter media. As set forth above one of the advances of the present invention is the ability to improve the rate of binding of the ion through rapid diffusion into the pores of the micronized additive. The ratio of the micronized additive to the macroporous additive can vary over a wide range with typical ratios on a weight basis of micronized additive to macroporous additive being from about 1:30 to about 1:10.

As set forth above the macroporous additive can be contacted with an aqueous solution of the cationic polymer.

The micronized anionic additive can then be added to the treated macroporous additive to form the association between the two additives linked by the cationic polymer. The combination of the two additives can be used as an additive combination and can be combined with filter media production for introducing the additive combination into the filter media. Further the additive combination can be combined with typical particulate used for the manufacture of filter media.

Filter medias are well-known in the filtration art. They typically include components which are insoluble in the medium to be filtered ie air or liquid. Components which are frequently used as filter medias include cellulose fibers, glass fibers, siliceous particulate such as diatomaceous earth, perlite including expanded perlite, talc, silica gel, clay and other particulate components. In general particulates are added in order to increase the rate of filtration and reduce the fouling of the filter surface as well as maintaining the structural and mechanical integrity of the filter layer. The filter media typically comprises a mixture of fibers and particulate material with concentrations of particulate material in the filter media typically being greater than about 50% by weight of the total filter media. The particulate is generally immobilized on the filter matrix such as a filter matrix formed from cellulose. Typically the cellulose fiber is derived from a highly refined wood pulp.

A particularly preferred process for manufacturing the micronized ion exchange additive filter media is using conventional paper making processes. In this process an aqueous slurry of micronized fibers of different diameters and lengths are formed under acidic conditions. The slurry after agitation is passed through a wire or fabric filter to produce a wet filter media with or without binders. The wet felt can be dried to the finished product. As set forth above it is preferred that the cationic polymer first be added to the fiber slurry followed by addition of the micronized additive optionally with a macroporous additive. In a further preferred embodiment the macroporous additive and the micronized additive can be first formed preferably in the presence of the cationic polymer and then added to the above fiber slurry. In a further embodiment the macroporous additive and cationic polymer can first be added to the fiber slurry followed by addition of the micronized additive. On filtration of the slurry the additive is retained in the filter media as a homogenous uniformly dispersed additive with a high particle count per unit filter media volume.

As set forth above, the macroporous additive substrate can be optimized for a filter media and the particular process requirements associated with such filter media. For example, in applications in which the macroporous particles are combined with other materials, such as fibers, polymers and particulate and depending on the requirements of the application, average particle size ranges of from about 3 microns to about 100 microns, or even less than about 5 microns, typically ranges of from about 3 microns to about 50 microns or from about 5 microns to about 25 microns are useful. The macroporous substrates, can be characterized by bulk density (gm/cc) which is the weight or mass per unit volume considered only for the particle itself, i.e., includes the internal pore volume, surface area (M2/gm), total pore volume (cc(hg)/gm), pore size distribution and percent apparent porosity. In general, it is preferred that the bulk density be from about 3% to about 60% more preferably from about 10% to about 40%, more preferably, from about 10% to about 25% of the true density of the substrate material. Bulk densities less—than about 5% are also useful. In addition, the macroporous substrate can have a wide range of surface area ($m^2$/gm) of from about 0.10 to about 700 preferably having a moderate to high surface area, preferably, from about 1 $m^2$/gm to about 300 $m^2$/gm, more preferably, from about 5 $m^2$/gm to about 50 $m^2$/gm.

The pore volume is preferably from about 0.4 cc/gm to about 3.5 cc/gm, or even up to about 5 cc/gm, more preferably from about 0.7 cc/gm to about 4.5 cc/gm more preferably from about 0.7 cc/gm to about 3.25 cc/gm. The pore size distribution can vary over a wide range and can have various distributions including multi-modal, for example, bi-modadistribution of pores including macro pores and micro pores. There ideally exists a relationship between pore diameter, surface area and pore volume, thus fixing any two variables generally determines the third. In general, the mean (50%) pore diameter for macro pores, i.e., generally classified as having a pore diameter greater than about 750 angstroms can vary from about 0.075 microns to about 15 microns, more preferably, from about 0.1 micron to about 10 microns. The average pore diameter can vary according to the average particle size distribution of the micronized metal inhibiting additive. In general it is preferred that the pore size distribution provide for a plurality of micronized ion exchange additive associated with the interior of the macroporous additive.

As set forth above, the macroporous substrate can be inorganic for example, an inorganic oxide, carbon and carbide, i.e., silicon carbide, sulfonated carbon preferably an inorganic oxide. Typical examples of inorganic oxides which are useful as substrates include for example, substrates containing one or more alumino silicate, silica, alumina, zirconia, magnesia, boria, phosphate, titania, ceria, thoria and the like, as well as multi-oxide type substrates such as alumina phosphorous oxide, silica alumina, zeolite modified inorganic oxides, e.g., silica alumina, perovskites, spinels, aluminates, silicates, e.g., zirconium silicate, mixtures thereof and the like. A particularly unique porous substrate is diatomite, a sedimentary rock composed of skeletal remains of single cell aquatic plants called diatoms typically comprising a major amount of silica. Diatoms are unicellular plants of microscopic size. There are many varieties that live in both fresh water and salt water. The diatom extracts amorphous silica from the water building for itself what amounts to a strong shell with highly symmetrical perforations. Typically the cell walls exhibit lacework patterns of chambers and partitions, plates and aperture's of great variety and complexity offering a wide selection of shapes. Since the total thickness of the cell wall is in the micron range, it results in an internal structure that is highly porous on a microscopic scale. Further, the actual solid portion of the substrate occupies only from about 10–30% of the apparent volume leaving a highly porous material for access to liquid. The mean pore size diameter can vary over a wide range and includes macroporosity of from about 0.075 microns to 10 microns with typical micron size ranges being from about 0.5 microns to about 5 microns. As set forth above, the diatomite is generally amorphous and can develop crystalline character during calcination treatment of the diatomite. For purposes of this invention, diatomite as produced or after subject to treatment such as calcination are included within the term diatomite.

The particularly preferred macroporous substrates for use in the filter media of this invention are diatomites obtained from fresh water and which have fiber-like type geometry, more preferably after calcination. By the term fiber-like type geometry is meant that the length of the diatomite is greater than the diameter of the diatomite and in view appears to be generally cylindrical and/or fiber like. It has been found that these fiber like fresh water diatomites provide what is believed to be enhanced electrolyte diffusion to the micronized metal inhibiting additive which provides for improved binding of the metal cation contaminant to the metal inhibiting additive.

The macroporous substrate for use in filter media, because of availability, cost and performance considerations, generally comprises acid resistant minerals, and/or ceramics more preferably in the form of particles, for example, fibers, and/or flakes, and/or beads including size reduced powders and hydrated powders.

The components including solid substrates such as fibers, organic polymers, the micronized additive and the water soluble cationic polymer linking agent for use in filter media have physical and chemical properties appropriate for the liquid and end use application. That is, as known in the art, the components exhibit some resistance to corrosion, erosion, oxidation and/or other forms of deterioration and/or degradation at the conditions present in the filter media.

One particular, unique aspect of the macroporous substrates is that the substrate is able to provide an internal reservoir for holding liquid during, for example, filtration. The internal reservoir improves the proximity of the liquid to the micronized additive for higher rate binding efficiency of the ions to the additive. As set forth above, the physical properties of the macroporous substrates can vary widely. It is preferred that the substrate have sufficient macro porosity and percent apparent porosity to allow for efficient filtration. In general, the preferable percent apparent porosity can vary from about 40% to about 92%, more preferably, from about 70% to about 90%. The mean pore diameter, particularly mean macro pore diameter, can vary over a wide range. Preferred mean macro pore diameter is from about 1 micron to about 15 microns, more preferably, from about 2 to about 12 microns or even from about 0.075 micron to about 10 micron and still more preferably from about 0.1 to about 5 microns.

As set forth above, it is preferred that the macroporous substrate particles have sufficient macroporosity and percent apparent porosity for improved filtration. Further, as set forth above, the preferred mean macropore diameter is from about 0.075 microns to about 10 microns and still more preferably from about 0.1 to about 5 microns. Particularly preferred solid porous particles that exhibit sufficient macroporosity are silica containing inorganic oxides preferably diatomites particularly those as set forth above.

The particularly preferred macroporous particles for use in the filter media of this invention are those within the macroporosity ranges set forth above and those derived from fresh water diatomites, preferably after calcination, having a fiber-like porous structure, i.e. the average length of the particle is greater than the average diameter of the base particle. It has been found that the macroporosity and the fiber-like and/or elongated geometry allows for rapid equilibration of the liquid in the filter media and for reducing the adverse effects caused by channeling of the liquid during filtration.

EXAMPLE 1

A filter media is manufactured on a paper making machine which has a head box for depositing a furnish to produce a web on a paper making wire. The paper making wire rotates in a clockwise direction advancing the web from left to right. The furnish (aqueous slurry of micronized fibers) has a low solids content of about 2% in acidified water. As the furnish is deposited on the paper making wire to form the web the liquid in the furnish flows through the wire and virtually all of the micronized fibers in the furnish are deposited on the paper making wire. The web of fibers is passed through a drying station typically including huge cans which are heated to above 100° C. The web is dried and wound into rolls before or after being split to a size suitable for use as a filter media.

A furnish is made comprising acidified water, pH 3.0, and a solid fiber of a soft wood refined cellulose fiber pulp. To the furnish slurry is added an aqueous water soluble cationic polyethylenimine linking aid identified as Polymen PR 971L at a concentration of 0.5 wt % basis the dry fiber solids content in the furnish. The slurry is slowly agitated for a period of ten minutes. To the agitated furnish is added 1.0 wt % (basis the dry fiber solids in the furnish) of a micronized porous organic polymer having 50% particle size count of less than 4 microns prepared from polystyrene and cross linked with divinylbenzene and having amino methylene phosphonic functional groups. The furnish is drained through the wire screen to produce a layered filter media. The wet layered filter media is dried.

The micronized polymer having phosphonic functional groups is associated with the interior of the filter media and high retention of the additive in the filter media is observed. The filter media is used to remove iron and antimony from a contaminated process water. The detrimental effects of iron and antimony in the process water are reduced by the additive in the filter media and the functionality in the interior pores of the micronized polymer are active for binding metals.

EXAMPLE 2

The filter media element of Example 1 is modified by using Polymen SKA. The cationic polymer is observed to 20. provide retention of an active micronized ion exchange inhibiting additive in the filter media.

EXAMPLE 3

The filter media element of Example 1 is modified by adding a macroporous additive to the furnish slurry of fibers prior to the addition of the cationic polymer linking aid. The macroporous polymer is a fresh water diatomite having an average particle size distribution of 15 microns and an average pore size distribution within the range of from 1 to 5 microns. The macroporous additive is added at a wt % (basis the weight of dry solids) of 20%. The filter media has excellent retention of the micronized porous additive and it is observed that the additive is associated with both the fiber as well as the interior portion of the macroporous additive and is active for the removal of iron, antimony, and copper from process water waste streams. The filter is also useful as an oil filter.

While this invention has been described with respect to various specific examples and embodiments, it is to be understood that the invention is not limited thereto and that it can be variously practiced within the scope of the following claim.

What is claimed is:

1. A filtration media comprising macroporous particles and ion exchange micronized porous organic polymer particles having a 50 percent number count size distribution less than 4 microns and ion exchanging functional groups on the external and internal surfaces of the micronized porous organic polymer particles which have a preferential affinity for at least one charged ion and a plurality of said micronized porous organic polymer particles are associated with the internal porosity of said macroporous particles, said macroporous particles having an average particle size distribution less than 25 microns and a pore size distribution which allows for a plurality of said micronized porous organic polymer particles to be associated with the internal porosity of said macroporous particles and said micronized porous organic polymer particles and macroporous particles are associated with said filtration media to allow said ion to substantially permeate to the internal surfaces of said micronized porous organic polymer particles.

2. The filtration media of claim 1 wherein the micronized porous organic polymer particles have cation exchange functional groups.

3. The filtration media of claim 2 wherein the cation functional groups are aminophosphonic.

4. The filtration media of claim 1 wherein the micronized porous organic polymer particles have anion exchange functional groups.

5. The filtration media of claim 1 wherein the micronized porous organic polymer particles are cross-linked polystyrene and the cross-linking is by divinylbenzene.

6. The filtration media of claim 1 wherein the ion is selected from the group consisting of iron and borate.

7. The filtration media of claim 1 wherein the 50% particle number count is less than about two microns.

8. A filtration media comprising ion exchange micronized porous organic polymer particles having a 50 percent particle number count less than 4 microns and ion exchanging functional groups on the external and internal surfaces of said micronized porous organic polymer particles which have a preferential affinity for at least one charged ion and a plurality of said micronized porous organic polymer particles are associated with the filtration media through a water soluble ionic charged linking agent associated preferentially with the external surface of said micronized porous organic polymer particles and said micronized porous organic polymer particles are associated with said filtration media to allow said ion to substantially permeate to the internal surfaces of said micronized porous organic polymer particles.

9. The filtration media of claim 8 wherein the micronized porous organic polymer particles have cation exchange functional groups.

10. The filtration media of claim 8 wherein the cation functional groups are aminophosphonic.

11. The filtration media of claim 8 wherein the micronized porous organic polymer particles have anion exchange functional groups.

12. The filtration media of claim 8 wherein the micronized porous organic polymer particles are cross-linked polystyrene and the cross-linking is by divinylbenzene.

13. The filtration media of claim 8 wherein the ion is selected from the group consisting of borate and iron.

14. A filtration media comprising macroporous particles and ion exchange micronized porous organic polymer particles having a 50 percent particle number count less than 4 microns and ion exchanging functional groups on the external and internal surfaces of the micronized porous organic particles which have a preferential affinity for at least one charged ion and a plurality of said micronized porous organic polymer particles are associated with the filtration media and the internal porosity of said macroporous particles through a water soluble linking agent, said macroporous particles having an average particle size distribution of less than 25 microns and a pore size distribution which allow for a plurality of said micronized porous organic polymer particles to be associated with the internal porosity of said macroporous particles and said micronized porous organic polymer particles and macroporous particles are associated with said filtration media to allow said ion to permeate to the internal surfaces of said micronized porous organic polymer particles.

15. The filtration media of claim 14 wherein the micronized porous organic polymer particles have cation exchange functional groups.

16. The filtration media of claim 15 wherein the cation functional groups are aminophosphonic.

17. The filtration media of claim 14 wherein the micronized porous organic polymer particles have anion exchange functional groups.

18. The filtration media of claim 14 wherein the micronized porous organic polymer particles are cross-linked polystyrene and the cross-linking is by divinylbenzene.

19. The filtration media of claim 14 wherein the ion is selected form the group consisting of borate and iron.

20. The filtration media of claim 14 wherein the 50 percent particle number count is less than about two microns.

* * * * *

UNITED STATES PATENT AND TRADEMARK OFFICE
CERTIFICATE OF CORRECTION

PATENT NO. : 6,767,460 B1
DATED : September 29, 2004
INVENTOR(S) : Clough, Thomas J.

It is certified that error appears in the above-identified patent and that said Letters Patent is hereby corrected as shown below:

Column 12,
Line 59, after the word "comprising" insert the following -- fiber-like freshwater diatomite. --

Column 13,
Line 25, after the word "comprising" insert the following -- a calcined fiber-like freshwater diatomite macroporous particle and. --
Line 32, after the phrase "associated with the" delete the phrase "filtration media and" and insert in place thereof the phrase -- internal porosity of macroporous particles. --
Line 32, after the word "through" delete the phrase "a water soluble."
Line 36, after the phrase "associated with" delete the phrase "said filtration media and" and insert in place thereof -- the internal porosity of macroporous particle. --

Column 14,
Line 9, after the word "comprising" insert the following -- fiber-like freshwater diatomite. --
Line 18, after the word "through" delete the phrase "a water soluble" and insert in place thereof -- an ionic charged. --

Signed and Sealed this

Twenty-first Day of December, 2004

JON W. DUDAS
*Director of the United States Patent and Trademark Office*